US006001270A

United States Patent [19]

[11] Patent Number: 6,001,270

Stephens et al.

[45] Date of Patent: Dec. 14, 1999

[54] STICKY HIGH WATER CONTENT GELS FOR EXTINGUISHERS

[75] Inventors: William D. Stephens; Leo K. Asaoka, both of Huntsville; Christi L. Salter, Decatur, all of Ala.

[73] Assignee: The United States of America as represented by the Secretary of the Army, Washington, D.C.

[21] Appl. No.: 09/039,503

[22] Filed: Mar. 16, 1998

[51] Int. Cl.[6] .............................. A62D 1/00; A62D 1/08; B01J 13/00

[52] U.S. Cl. ................................ 252/2; 252/8.05; 252/8; 252/604; 252/607; 252/601; 516/111; 516/85; 516/921; 516/922

[58] Field of Search .................................. 252/2, 8.05, 8, 252/601, 604, 603, 610, 611, 194, 607; 516/111, 85, 921, 922

[56] References Cited

U.S. PATENT DOCUMENTS

| | | | |
|---|---|---|---|
| 3,976,580 | 8/1976 | Kaminstein et al. | 252/2 |
| 4,008,170 | 2/1977 | Allan | 252/194 |
| 4,226,727 | 10/1980 | Tarpley, Jr. et al. | 252/8 |
| 4,274,883 | 6/1981 | Lumbeck et al. . | |
| 5,342,597 | 8/1994 | Tunison, III | 423/335 |
| 5,441,560 | 8/1995 | Chiotis et al. | 106/18.12 |
| 5,518,638 | 5/1996 | Buil et al. | 252/2 |
| 5,676,316 | 10/1997 | Hanna | 241/22 |
| 5,830,384 | 11/1998 | Stephens et al. | 252/194 |
| 5,833,874 | 11/1998 | Stewart et al. | 252/8 |

*Primary Examiner*—Joseph D. Anthony
*Attorney, Agent, or Firm*—Arthur H. Tischer; Freddie M. Bush

[57] ABSTRACT

Sticky high water content gelled fire extinguisher compositions hold the advantage of providing a high water content, slightly viscous (sticky) gel with flow properties similar to water. The ability of this material to stick to burning surfaces is what sets it apart from water extinguishers. Not only are fires extinguished, but also surfaces are cooled by the sticky gel as the water evaporates. The basic gelled fire extinguisher composition is comprised of about 88 weight percent water and about 12 weight percent of a 7 nanometer particle size silicon dioxide gellant. The silicon dioxide gellant is available as EH5 tradename by Cabot for this silicon dioxide gellant. Other ingredients such as dispersants, wetting agents and flame retardants can be used as additives in combination with the gelling agent. The actual gel system is inexpensive, made from readily available ingredients and easily prepared.

1 Claim, No Drawings

STICKY HIGH WATER CONTENT GELS FOR EXTINGUISHERS

DEDICATORY CLAUSE

The invention described herein may be manufactured, used, and licensed by or for the Government for governmental purposes without the payment to us of any royalties thereon.

BACKGROUND OF THE INVENTION

The Army has sticky napalm gasoline/gellant/detergent fuel for flame-throwers and fire bombs. The "napalm gasoline gel" functions as fire setting/spreading. A similar concept can be used (military/civilian use technology) for improved extinguisher material compositions based on a high water content coolant, sticky gellant, tri-sodium phosphate dispersant, wetting agent, flame retardant composition. This fire retardant material can be sprayed and would stick to burning or flammable surfaces or personnel and extinguish or retard fire spreading. This material would also be inexpensive, non-toxic, readily available and easily prepared.

A commonly assigned U.S. Pat. No. 4,008,170, titled: "Dry Water", was issued to Barry D. Allan on Feb. 15, 1977. This patent discloses a submicroscopic particulate silica having a particle size range from about 15–20 m$\mu$ that is prepared in a hot gaseous environment at about 1100° C. by the vapor phase hydrolysis of a silicon compound. This product is reacted with liquid water in a ratio in weight percent of about 1 part water to about water to about 9 parts water to 1 part of the particulate silica to yield a powdered product which remains flowable over a wide temperature, even when cooled to an extremely low temperature of −196° C. The adsorbed water is liberated on heating the powdered product. The powdered product with adsorbed water, up to 90 weight percent, has utility as a coolant by liberating water on heating. The powdered product is useful as moisture source for miscellaneous purposes over a wide temperature range. The described product, which is known as "dry water", remains flowable over a wide temperature; hence, the term "dry water" is fitting to the properties of the patented product.

An object of this invention is to provide a sticky high water content gel for extinguishers.

A further object of this invention is to provide a sticky high water content gel fire retardant material which can be sprayed and would stick to burning or flammable surfaces or personnel and extinguish or retard fire spreading.

Still another object of this invention is to provide a sticky gel system which can be made from inexpensive and readily available non-toxic materials and which is easily prepared.

SUMMARY OF THE INVENTION

Sticky high water content gel for extinguishment of fires and retards spreading. The concept is similar to the "napalm gasoline gel" used in fire bombs and flame throwers, except that the usage is completely opposite, e.g. extinguishment rather than fire setting/spreading. This gellant concept is also used in gelling rocket fuels and oxidizers by the Army. The water gel contains a small amount of sodium triphosphate (dispersant/wetting agent/flame retardant). Other water soluble inorganic flame retardants such as sodium bromides can also be added. All of the above ingredients are inexpensive and commercially available. This gel composition when sprayed onto burning wood or similar surfaces, spreads/sticks to it, and extinguishes the flame rapidly by smothering/cooling the burning surface. As the water evaporates and temperature rises in the gel-coating on the burning surface, the gellant and retardant concentration rises and maintains gel viscosity/flame retarding effectiveness.

The basic gelled fire extinguisher composition is comprised of about 88 weight percent water and about 12 weight percent of a 7 nanometer particle size silicon dioxide gellant. The silicon dioxide gellant is available as EH5 tradename by Cabot for this silicon dioxide gellant. Other ingredients such as dispersants, wetting agents and flame retardants can be used as additives in combination with the gelling agent. The actual gel system is inexpensive, made from readily available ingredients and easily prepared.

DESCRIPTION OF THE PREFERRED EMBODIMENT(S)

Baseline compositions tested in proof-of-principle tests contained 88% available water from the reaction product "dry water" of about 100 parts and 12% of a 7 nm ("EH5" tradename by Cabot) silicon dioxide gellant. This composition with this particular gellant provided a material with the highest percentage of water to give the optimum flow properties while still containing enough gellant to provide high enough viscosity to remain sticky. This material was tested in a modified caulking-gun tube. This material was pressurized with 25 psi air. A 45° vortex was cut in the tip of the tube to simulate a nozzle. This material was tested on kerosene soaked sheets of cardboard. The fires were successfully extinguished and the cardboard was also completely cooled off.

It is to be understood, therefore, that while the present invention has been described by means of specific examples, it should not be limited thereto, for obvious variations and modifications may occur to those skilled in the art and such variations and modifications may be adhered to without departing from the spirit of the invention or the scope of the applied claims.

We claim:

1. A sticky high water content gel composition for fire extinguishers, said composition comprising:

i. a powdered reaction product of liquid water and a submicroscopic particulate silica that is at least 99.9 percent silica and that has a particle size rang e of about 15–20 mu, said powdered reaction product prepared by adding slowing, while stirring, liquid water in ratio in weight percent of about 1 part water to about 9 parts water to 1 part of said submicroscopic particulate silica to yield said powdered reaction product containing from about 50 weight percent up to about 90 weight percent adsorbed water, said powdered reaction product being present in a weight percent amount of about 100 parts based on the total weight of the composition;

ii. about 12 parts, based on the total weight of the composition, of 7 nanometer particle size silicon dioxide gellant to provide a composition with the highest percentage of water to give the optimum flow properties while still containing enough gellant to provide high enough viscosity to remain sticky; and iii. optional additives selected from the group consisting cf sodium triphosphate and sodium bromides, which function as dispersant/wetting agents/flame retardant; wherein said gel composition has the ability to both extinguish fires and to stick to burning surfaces because of its sticky properties.

* * * * *